US012692813B2

(12) United States Patent
Waissi et al.

(10) Patent No.: US 12,692,813 B2
(45) Date of Patent: Jul. 28, 2026

(54) WAISSI ENGINE DRIVETRAIN BEARING RING INTERFACE TO PISTON BASE BEARING PAD

(71) Applicants: Gary Ray Robert Waissi, Cave Creek, AZ (US); Robert Waissi, Ann Arbor, MI (US)

(72) Inventors: Gary Ray Robert Waissi, Cave Creek, AZ (US); Robert Waissi, Ann Arbor, MI (US)

( * ) Notice: Subject to any disclaimer, the term of this patent is extended or adjusted under 35 U.S.C. 154(b) by 0 days.

(21) Appl. No.: 19/209,728

(22) Filed: May 15, 2025

(65) Prior Publication Data

US 2025/0277468 A1 Sep. 4, 2025

(51) Int. Cl.

| | |
|---|---|
| ***F02B 75/24*** | (2006.01) |
| ***F01B 9/06*** | (2006.01) |
| ***F01M 11/02*** | (2006.01) |
| ***F02B 75/32*** | (2006.01) |
| *F01M 1/02* | (2006.01) |

(52) U.S. Cl.

CPC ................ *F02B 75/24* (2013.01); *F01B 9/06* (2013.01); *F01M 11/02* (2013.01); *F02B 75/32* (2013.01); *F01M 1/02* (2013.01); *F01M 2011/026* (2013.01)

(58) Field of Classification Search

CPC . F02B 75/24; F02B 75/32; F01B 9/06; F01M 11/02; F01M 1/02; F01M 2011/026

See application file for complete search history.

(56) References Cited

U.S. PATENT DOCUMENTS

| | | | |
|---|---|---|---|
| 5,402,755 | A | 4/1995 | Waissi |
| 8,109,244 | B1 | 2/2012 | Waissi |
| 8,534,240 | B1 | 9/2013 | Waissi et al. |
| 8,875,673 | B2 | 11/2014 | Waissi et al. |
| 12,025,224 | B1 | 7/2024 | Waissi et al. |

OTHER PUBLICATIONS

Waissi, Gary R., Internal Combustion (IC) Engine with Minimum Number of Moving Parts, Futuristic Concepts in Engines and Components, (1995), pp. 61-64, SAE International, SP-1108, 950090, U.S.A.

*Primary Examiner* — Gonzalo Laguarda

(57) ABSTRACT

Improvements to the Waissi Engine internal combustion engine (ICE) drivetrain are proposed: First, the convex- to concave interface between the outer perimeter of the bearing ring and the bearing pad of the piston base allows for the piston structure a small axial rotational movement tolerance, perpendicular to the driveshaft axis, for manufacturability, assembly, and operation; second, the convex- to concave interface between the outer perimeter of the bearing ring and the bearing pad of the piston base, provides for an improved hydrodynamic lubrication condition between the piston base bearing pad and the bearing ring. The linear concave bearing pad surface shape helps keep the lubricating oil within the interface, and provides for hydrodynamic lubrication condition of the bearing interface.

1 Claim, 5 Drawing Sheets

WAISSI ENGINE DRIVETRAIN BEARING RING INTERFACE TO PISTON BASE BEARING PAD

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

CROSS-REFERENCE TO RELATED PATENTS

U.S. Pat. No. 12,025,224 B1 of Jul. 2, 2024
U.S. Pat. No. 8,875,673 B2 of Nov. 4, 2014
U.S. Pat. No. 8,534,240 B1 of Sep. 17, 2013
U.S. Pat. No. 8,109,244 B1 of Feb. 7, 2012
U.S. Pat. No. 5,402,755 of Apr. 4, 1995.

REFERENCES CITED
U.S. PATENT DOCUMENTS

| | | | |
|---|---|---|---|
| 12,025,224 B1 | July 2024 | Waissi G. and Waissi R. | 123/55.2, 52.1, 55.5; 74/48-51, 54, 55; 384/11, 50 |
| 8,875,673 B2 | November 2014 | Waissi G. and Waissi R. | 123/55.2, 52.1, 55.5; 74/48-51, 54, 55; 384/11, 50 |
| 8,534,240 B1 | September 2013 | Waissi G. and Waissi R. | 123/55.3; 123/197.4; 123.55.2; 123/55.4; 74/48; 74/51; 74/54 |
| 8,109,244 B1 | February 2012 | Waissi G. | 123/55.3; 123/197.4 |
| 5,402,755 | April 1995 | Waissi G. | 123/55 |

JOURNAL ARTICLES

Waissi, Gary R., Internal Combustion (IC) Engine with Minimum Number of Moving Parts, Paper No. 950090, Futuristic Concepts in Engines and Components, SAE SP-1108, pp. 61-64, (1995).

FIELD OF THE INVENTION

This invention relates to an internal combustion engine (ICE), and more particularly to the prior art reciprocating ICE with opposed and aligned cylinders proposed by Waissi G. and Waissi R., U.S. Pat. No. 12,025,224 B1, Waissi G. and Waissi R., U.S. Pat. No. 8,875,673 B2, Waissi G. and Waissi R., U.S. Pat. No. 8,534,240 B1, Waissi G., U.S. Pat. No. 8,109,244 B1, and Waissi G., U.S. Pat. No. 5,402,755, as well as disclosed in the journal article by Waissi G., SAE SP-1108 paper No. 950090 (1995).

BACKGROUND OF THE INVENTION

The prior art engine (U.S. Pat. Nos. 12,025,224 B1, 8,875,673 B2, 8,534,240 B1, 8,109,244 B1 and 5,402,755) is an internal combustion engine with opposed and aligned cylinders, called here the Waissi Engine. The Waissi Engine consists of at least one pair of aligned and opposed cylinders wherein a reciprocating double-headed piston is slidably mounted, and in which the double-headed piston axis intersects perpendicularly with the axis of a driveshaft. The reciprocating motion of the double-headed piston is transmitted to the driveshaft by a rotating crankdisk. The crankdisk is mounted off-centered to the driveshaft, which is rotably mounted to a crankcase. The crankdisk outer perimeter is annular forming a circle. The double-headed piston has two slots perpendicularly through its axis, one of which is to allow for a rotating movement of the crankdisk, and the other, to allow for the rotation of the driveshaft. The prior art further discloses that a non-rotating bearing ring is mounted on the annular crankdisk, and that the crankdisk rotates inside, and hydrodynamically engages, the bearing ring. It is further disclosed in the prior art, that the bearing ring outer surface consists of linear parallel surfaces slidably and hydrodynamically engaging each piston base. The prior art further discloses that the double-headed piston may be assembled from multiple components or parts, which form an integrated, rigid, piston structure.

In conventional prior art ICEs (V-, in-line, opposed) the metal to metal contact between the piston connecting-rod big-end and the crankshaft is avoided by creating hydrodynamic lubrication condition in an oil film of the connecting-rod to crankshaft bearing (journal bearing). It is therefore, and in order to reduce friction and wear, highly desirable to create similar hydrodynamic lubrication conditions in the piston base-to-bearing-to-crankdisk contact surfaces of the Waissi Engine.

The prior art improvement (SAE SP-1108, Paper No. 950090, Futuristic Concepts in Engines and Components, pp. 61-64, (1995)) to the Waissi Engine propose to reduce friction between the crankdisk annular bearing surface and piston internal bearing surfaces by a special bearing ring. Within this improvement the outer perimeter surface of the crankdisk acts as a bearing and slides inside the bearing ring. The crankdisk has a diameter and annular perimeter design that fits tightly but slidably inside the bearing ring. The bearing ring, with a diameter that fits in-between the piston slot linear bearing surfaces (or inside the piston slot), is intended to roll or slide on the piston slot bearing surface. The crankdisk perimeter and surface design correspond the conventional engine crankshaft-piston rod journal design to provide for hydrodynamic lubrication.

The prior art (U.S. Pat. No. 8,109,244 B1) improvement discloses specific designs for the crankdisk and bearing ring to provide for assembly as well as for holding the bearing ring in its designed location when the crankdisk rotates. The bearing ring is installed on the crankdisk to provide for hydrodynamic lubrication conditions between the crankdisk and the bearing ring, and for oil-splash lubrication between the bearing ring and the piston slot surface. The bearing ring, with a diameter that fits in-between the piston slot linear bearing surfaces (or inside the piston slot), is intended to roll or slide on the piston slot bearing surface.

The prior art (U.S. Pat. No. 8,109,244 B1) discloses two specific distinct designs for the crankdisk-bearing combination. One of the designs consists of a machined or casted groove or depression on the crankdisk outer annular surface, in which one or both of the flanges or sides of the groove of the crankdisk are removable to allow for a flat I-profile bearing ring installation such that the bearing ring fits tightly but slidably in-between the flanges of the crankdisk annular bearing surface. The second, or alternative, design consists of a machined or casted groove on the inside surface of the bearing ring, forming a U-profile with flanges facing toward the center of the bearing ring, in which one or both of the flanges or sides of the groove are removable to allow for the U-profile bearing ring installation such that the crankdisk bearing surface fits tightly but slidably in-between the bearing ring flanges. Both designs propose modifications in form of casting or machining a U-profile on either the inside surface of the bearing ring or the annular outside surface of the crankdisk with one or both flanges or sides removable respectively. Both proposed designs provide for assembly as well as for holding the bearing ring in its designed location when the crankdisk rotates. Both proposed designs also provide for hydrodynamic lubrication condition between the crankdisk annular bearing surface and the inner surface of the bearing ring, and for oil-splash lubrication between the bearing ring outer surface and the piston slot surface. The bearing ring, with a diameter that fits in-between the piston slot linear bearing surfaces (or inside the piston slot), is intended to roll or slide on the piston slot bearing surface.

The prior art (U.S. Pat. No. 8,534,240 B1) discloses a design, in which the bearing ring is held in its place in a slot bounded laterally only by the connecting members of the integrated double-headed piston assembly. The proposed design provides for assembly as well as for holding the bearing ring in its designed location when the crankdisk rotates. The proposed design also provides for hydrodynamic lubrication condition between the crankdisk annular bearing surface and the inner perimeter surface of the bearing ring, and for oil-splash lubrication between the bearing ring outer perimeter surface and the piston slot surface. The bearing ring, with a diameter that fits in-between the piston slot linear bearing surfaces (or inside the piston slot), is intended to roll or slide on the piston slot bearing surface.

The prior art (U.S. Pat. No. 8,875,673 B2) discloses a design, in which the linear bearing surface of the piston slot wall is provided with flanges (a U-shaped groove) to hold the bearing ring in its designed position, when the crankdisk rotates. In the proposed design the flanges are fixed, as the two piston heads are assembled together to form an integrated rigid piston structure. The proposed design provides for assembly as well as for holding the bearing ring in its designed location when the crankdisk rotates. The proposed design also provides for hydrodynamic lubrication condition between the crankdisk annular bearing surface and the bearing ring inner perimeter surface, and for oil-splash lubrication between the bearing ring outer perimeter surface and the piston slot surface. The bearing ring, with a diameter that fits in-between the piston slot linear bearing surfaces (or inside the piston slot), is intended to roll or slide on the piston slot bearing surface.

The prior art (U.S. Pat. No. 12,025,224 B1) discloses a design, in which the proposed bearing ring consists of a shape for the outer perimeter of the bearing ring, which has two flat, linear, parallel surface sections engaging slidably the two flat, linear, parallel slot surfaces of the piston. In the arrangement, the flat linear surface sections of the outer perimeter of the bearing ring engage the piston slot wall flat linear surfaces preventing the bearing ring from rotating. Within the design, further, the flat linear outer surface sections of the bearing ring, engaging tightly but slidably inside the piston slot, slide under hydrodynamic conditions on the piston slot linear wall surfaces when the crankdisk rotates.

The subject of this invention is to provide for hydrodynamic lubrication conditions between the contact surface of the outer surface of the non-rotating bearing ring and the piston slot wall surface to reduce the friction on this interface, while maintaining the hydrodynamic lubrication conditions between the bearing ring inner perimeter surface and the crankdisk outer perimeter surface. In this design the non-rotating bearing ring outer contact surface is linear and convex, and the piston base is provided with a bearing pad with a linear, concave, contact surface. This design, a convex, linear, outer perimeter surface interfacing with a concave, linear, bearing pad on the piston base serves two functions. First, the convex- to concave interface between the outer perimeter of the bearing ring and the bearing pad of the piston base allows for the double-headed piston structure a small axial rotational movement tolerance, perpendicular to the crankshaft/driveshaft axis, for manufacturability, assembly, and operation. Second, the convex- to concave interface between the outer perimeter of the bearing ring and the bearing pad of the piston base, provides for an improved hydrodynamic lubrication condition between the piston base bearing pad and the bearing ring, as the centrifugal force of the rotating crankdisk pushes oil through the non-rotating bearing ring hole to the interface between the outer perimeter of the bearing ring linear convex surface and the piston base bearing pad concave surface. Here, the linear concave bearing pad surface shape helps keep the lubricating oil within the interface, and the, said, shape provides a guide for the oil to travel along the concave linear bearing pad to convex linear bearing ring interface path toward the ends of the bearing pad and provides for hydrodynamic lubrication condition of the bearing interface.

BRIEF SUMMARY OF THE INVENTION

A main object of the present invention is to provide an improvement to the Waissi Engine, which provides for hydrodynamic lubrication condition between the bearing ring outer linear, convex, surface and the linear, concave, bearing pad of the piston base, while at the same time allowing for a small, axial and rotational, movement of the piston structure relative to the crankshaft/driveshaft rotation axis, and, thereby, providing for manufacturability-, assembly- and operating tolerance. The invention comprises the features hereinafter described and particularly pointed out in the claims. The following description and the attached drawings set forth in detail certain illustrative, however indicative, embodiment of the invention, of but a few ways in which the principles of the invention may be employed.

The main object of this invention is accomplished by modifying the outer perimeter shape and function of the bearing ring of the prior art Waissi Engine. The prior art bearing ring utilizes an annular (perfectly circular) inner perimeter shape of the bearing ring, which slidably, under hydrodynamic conditions, engages the annular (perfectly circular) shape of the outer perimeter of the crankdisk. The prior art bearing ring outer surface includes two linear, flat, surface sections, which slide against the linear, flat, piston bases. The proposed bearing ring is modified to improve the shape of each outer perimeter surface facing each piston base to provide a linear, convex, surface, with at least one lubrication hole on each convex surface, engaging hydrodynamically the linear, concave, bearing pad, of each piston base.

In the proposed arrangement, the linear, convex, surface sections of the outer perimeter of the non-rotating bearing ring engage the linear, concave, bearing pads of the piston slots. Within the proposed design, further, the linear, convex, outer surface sections of the non-rotating bearing ring, engaging tightly but slidably against the concave, bearing pads, of the piston base, slide under hydrodynamic conditions when the crankdisk rotates.

The outer perimeter of the non-rotating bearing ring is provided with two linear, convex, sections, with each having at least one oil distribution hole to allow lubrication oil to pass from the space in-between the crankdisk outer annular surface and the bearing ring inner annular surface, to the space between the non-rotating bearing ring outer linear, convex, surface section and the linear, concave, bearing pad installed on the piston base.

In order to provide for hydrodynamic lubrication conditions, oil is pumped under pressure through the inside cavity of the driveshaft through provided channels inside the crankdisk to the space between the crankdisk outer perimeter surface and the bearing ring inner perimeter surface. The oil under pressure will be distributed around the inner surface of the bearing ring and through one or more holes, provided through the bearing ring to the lubrication space interface between the linear, convex, outer surface sections of the bearing ring and the linear, concave, surfaces of the bearing pads of the piston bases.

Within the proposed design the bearing ring is installed in such a way that the linear, convex, bearing ring surfaces on the outer perimeter of the bearing ring fit tightly, and slide against the linear, concave, bearing pads of the piston bases, while at the same time allowing for a for a small, axial and rotational, movement of the piston structure relative to the driveshaft axis, allowing for manufacturing, assembly and operating tolerance. Within the proposed design, also, the flat inner annular perimeter of the non-rotating bearing ring fits tightly but slidably on the crankdisk, and slides under hydrodynamic conditions on the annular perimeter surface of the crankdisk. The design of the linear, convex, outer perimeter sections of the crankdisk interfacing the linear, concave, bearing pad surface, in addition, helps hold and guide the lubricating oil in-between the surfaces because of the concave design shape of the bearing pad interface. When the crankdisk rotates a centrifugal force, in addition to the oil pressure generated by the oil pump, helps push lubricating oil to the interface between each linear, convex, outer perimeter surface section of the bearing ring and each linear, concave, bearing pad surface, respectively.

BRIEF DESCRIPTION OF THE SEVERAL VIEWS OF THE DRAWINGS

The main object, features and advantages of this invention will become apparent from a consideration of the following description, the appended claims and the accompanying drawings in which:

FIG. 1 shows the straight driveshaft (identified with number 100), circular crankdisk (101), non-rotating bearing ring (103), piston base bearing pad (105), piston head (106, two piston heads shown), piston head connecting frame (102, one on each side of the crankdisk/bearing ring assembly), piston head to connecting frame connecting bolts (107), counter weight (104, one on each side of the piston head to connecting frame assembly). The piston heads (106), with bearing pads (105), and piston connecting frames (102) form an integrated piston structure, which reciprocates, perpendicularly to the driveshaft (100), in aligned and horizontally opposed cylinders (cylinders not shown for clarity). It is noted that at least one connecting frame is required between the piston heads to integrate the two piston heads into one piston structure. The piston head connecting frames (102) provide two slots perpendicular to each other through the axis of the piston structure, one of which is to allow for a rotating movement of the crankdisk (101), and up-and-down, non-rotating, movement of the bearing ring (103) installed on the crankdisk (101), and the other slot, to allow for the rotation of the driveshaft (100). The bearing ring (103) has an outer linear, convex, contact surface on opposing sides with each interfacing with piston slot wall linear, concave, bearing pad and surface. The bearing pad is identified as 105 in FIG. 1. Other parts and components are not shown for clarity. It has to be noted, that the two gears shown on the driveshaft (100) serve to drive the cylinder head valve overhead cams of a specific application. Those gears are not part of this invention disclosure.

FIG. 2 shows the straight driveshaft (100), piston head connecting frames (102, one on each side of the bearing ring), non-rotating bearing ring (103) with linear, convex, surfaces interfacing the linear, concave, bearing pad (105) of each piston (106) base, exploded view of the bearing pad (105), piston (106) head and connecting bolts (107). Other parts and components are not shown for clarity.

FIG. 3 shows the straight driveshaft (100), crankdisk (101), piston head connecting frame (102), non-rotating bearing ring (103), counter weight (104), bearing pad (105), piston (106) head, piston head- to piston connecting frame bolts (107).

FIG. 4 shows the crankdisk (101), non-rotating bearing ring (103) with linear, convex, sections interfacing the linear, concave, bearing pads (105), and oil lubrication holes (108) through the crankdisk perimeter surface from inside the driveshaft (oil lubrication holes at 120 degree phasing on the crankdisk and the driveshaft, driveshaft not shown for clarity), and oil lubrication hole on the linear, convex, outer surface of the bearing ring (103).

FIG. 5 shows the crankdisk (101), non-rotating bearing ring (103) with linear, convex, sections interfacing the linear, concave, bearing pads (105), and three oil lubrication holes (108) through the crankdisk perimeter surface from inside the driveshaft (oil lubrication holes at 120 degree phasing on the crankdisk and the driveshaft, driveshaft not shown for clarity), and one oil lubrication hole through each of the linear, convex, surface sections of the bearing ring (103).

DETAILED DESCRIPTION OF THE INVENTION

Figure 1:
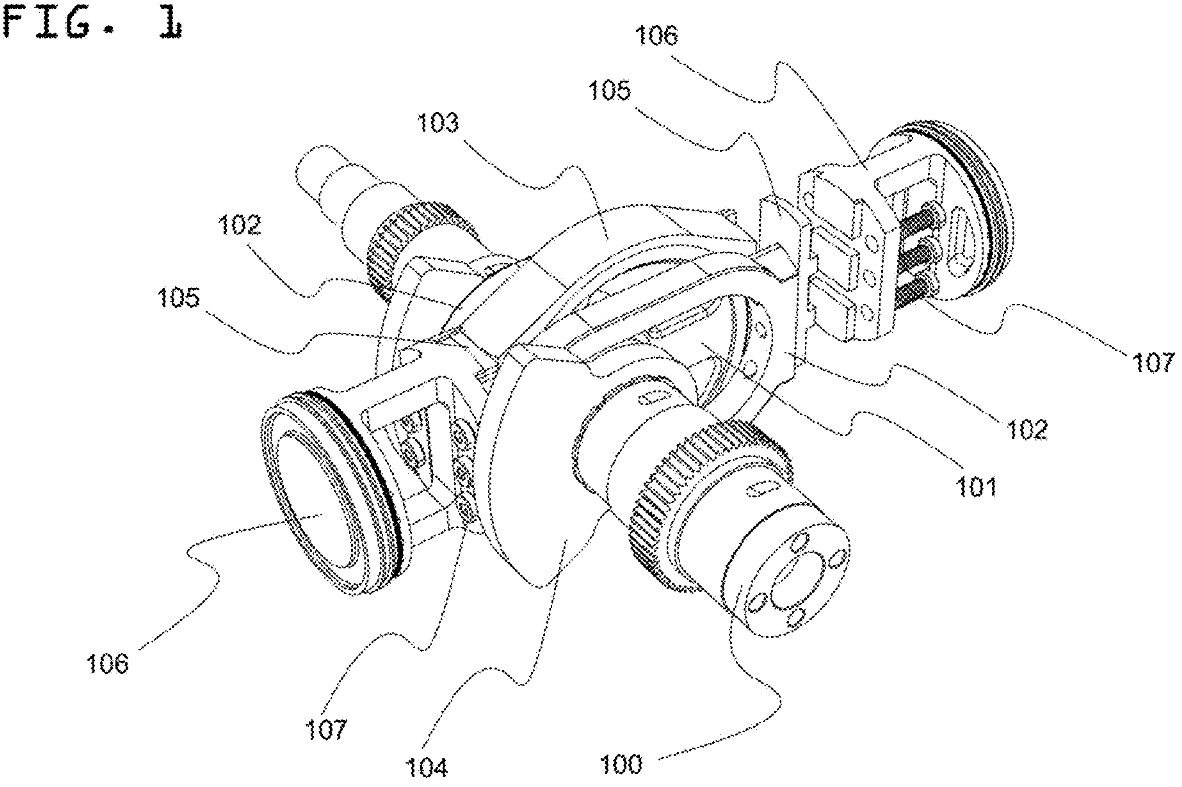
FIG. 1 (adapted from U.S. Pat. Nos. 12,025,224 B1, 8,875,673 B2, 8,534,240 B1, 8,109,244 B1, 5,402,755 and from SAE SP-1108, Paper No. 950090, Futuristic Concepts in Engines and Components, pp. 61-64, (1995)) is a perspective view of the Waissi Engine drivetrain.
Figure 2:
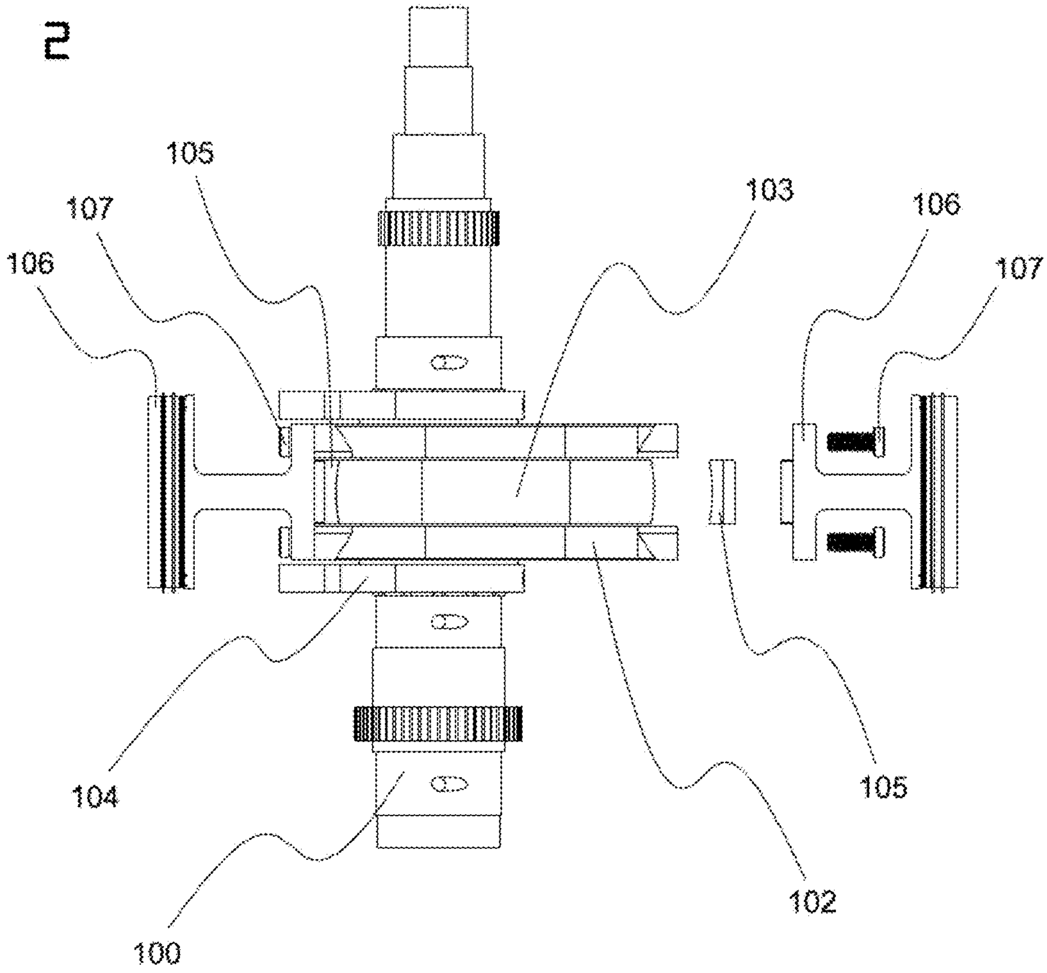
FIG. 2 shows the top view of the drivetrain. In particular.
Figure 3:
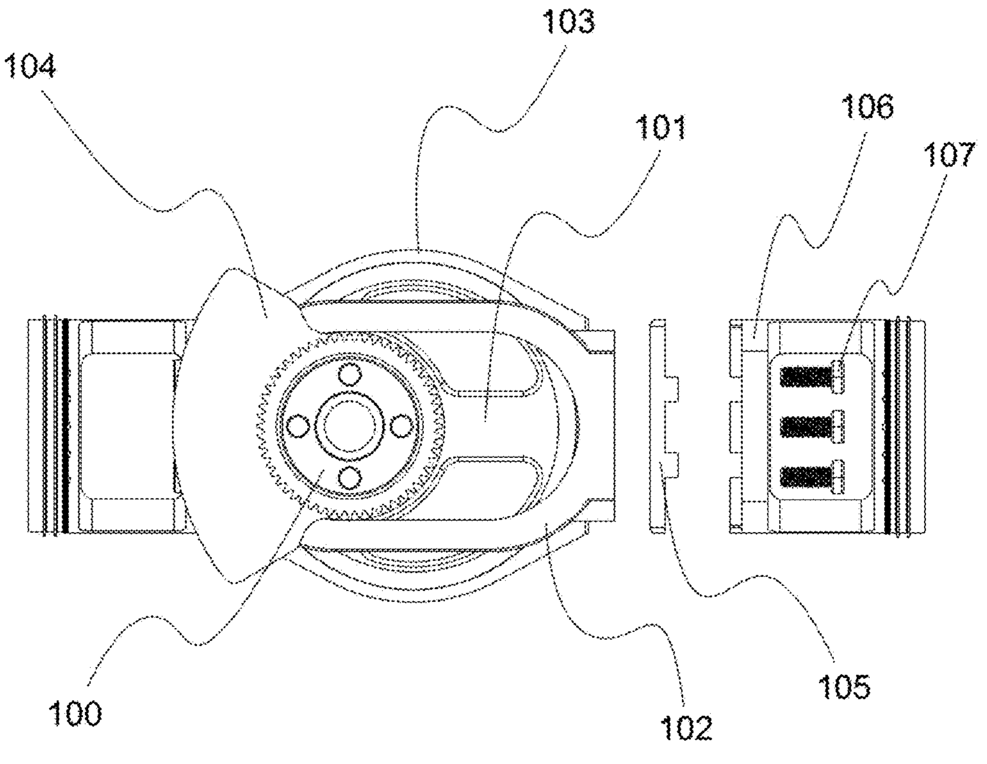
FIG. 3 shows the end view of the drivetrain. In particular.

In FIG. 1 (adapted from U.S. Pat. Nos. 12,025,224 B1, 8,875,673 B2, 8,534,240 B1, 8,109,244 B1, 5,402,755 and from SAE SP-1108, Paper No. 950090, Futuristic Concepts in Engines and Components, pp. 61-64, (1995)) the double-headed piston structure (consisting of 106, 105, 102) reciprocates, perpendicularly to the driveshaft (100), in the aligned and horizontally opposed cylinders. The straight driveshaft (100) is rotably mounted to the crankcase. The center axis of the driveshaft (100) is the center of rotation of the driveshaft. The crankdisk (101) is off-centered attached to the driveshaft (100). The crankdisk (101) is located at the axis of the piston structure.

The outer annular perimeter surface of the crankdisk (101) acts as a bearing and slides under hydrodynamic conditions inside the non-rotating bearing ring (103), which is provided with linear, convex, surface sections on the outer perimeter of the bearing ring facing the each piston (106) base, and engaging under hydrodynamic conditions the linear, concave, bearing pad (105) surface of each piston (106) base.

Figure 4:
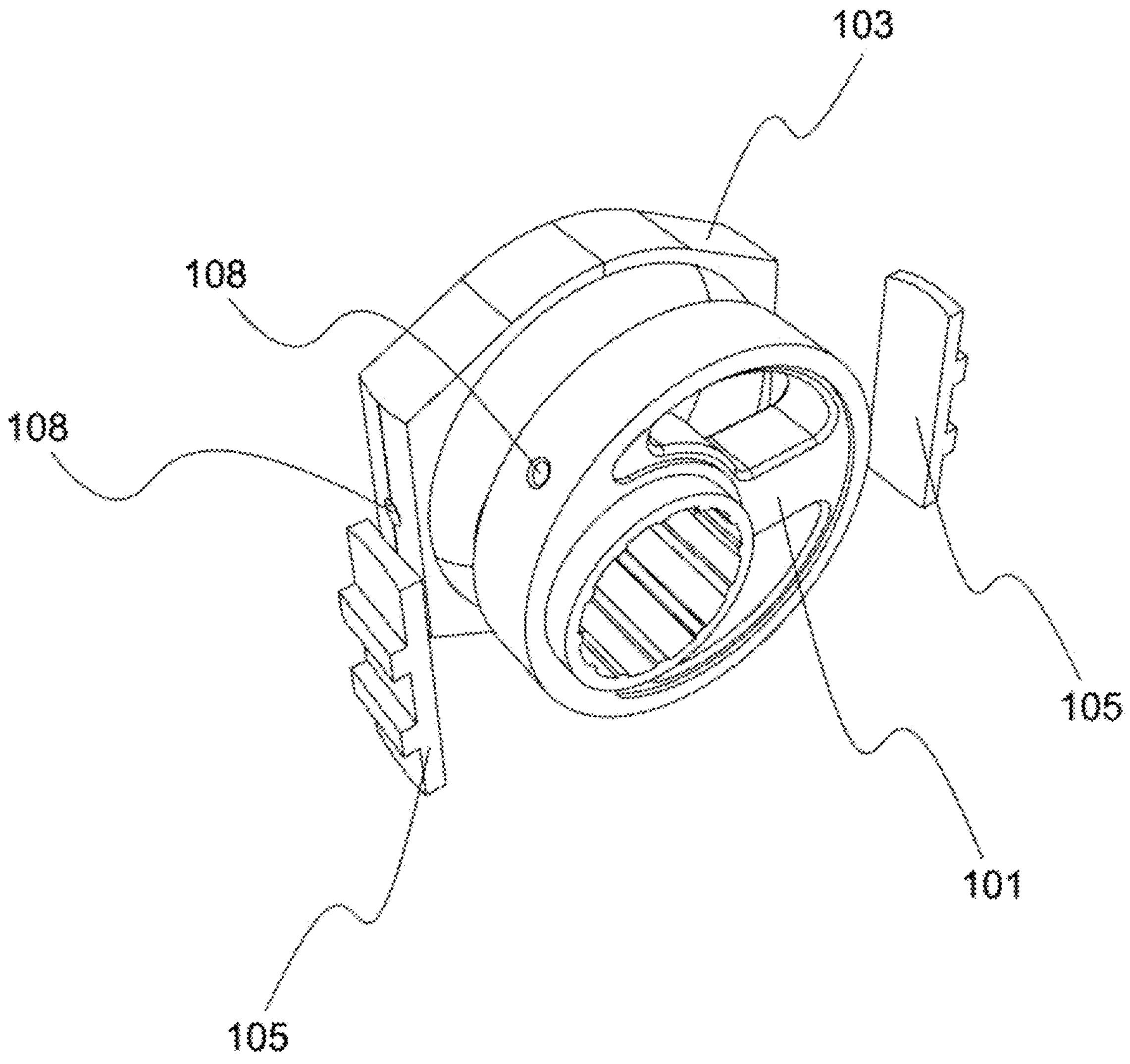
FIG. 4 shows an exploded, perspective, view and key elements of the invention, and the oil lubrication holes. In particular.
Figure 5:
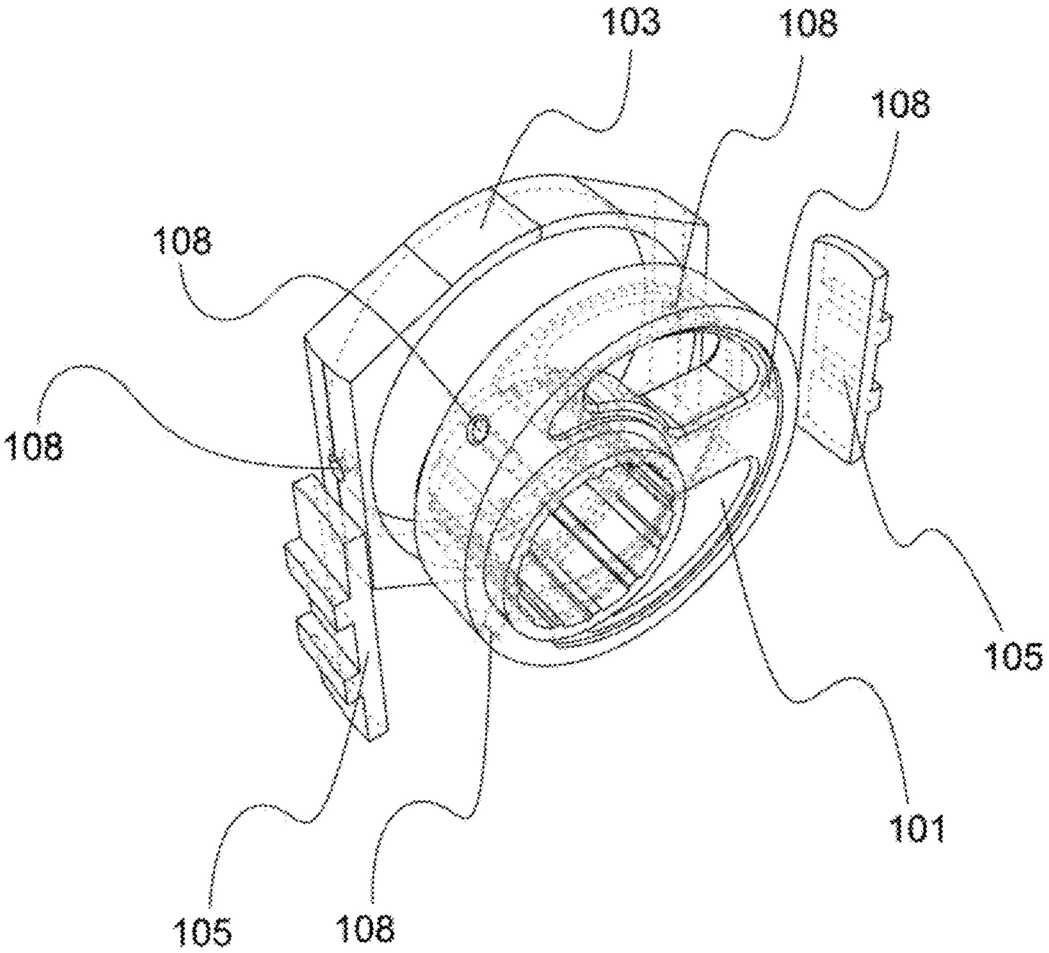
FIG. 5 shows an exploded, transparent, perspective view and key elements of the invention, and the oil lubrication holes. In particular.

The key elements of this invention, shown in FIG. 4, consist of, first, the non-rotating bearing ring (103) with two linear, convex, surfaces on the outer perimeter interfacing the two linear, concave, bearing pad (105) surfaces, and secondly, the oil distribution holes and cavities provided through the crankdisk (101) to the internal annular surface of the non-rotating bearing ring (103), and through at least one hole through each of the linear, convex, surfaces of the bearing ring interfacing, and slidably engaging, the linear, concave, surface of each bearing pad (105). First, the linear, convex, outer perimeter surface of the bearing ring (103) interfacing with the linear, concave, bearing pad (105) surface allows for a small axial, rotational, movement tolerance, with respect to the driveshaft axis, for manufacturability, assembly and operation, when the driveshaft rotates and engages the bearing pads (105) of the piston (106) heads of the integrated piston structure. Second, hydrodynamic conditions are created by oil being pumped under pressure through channels or cavities provided through the crankdisk (101) connecting the center of the driveshaft oil supply to the outer annular perimeter bearing surface and interface of the crankdisk (101) and the bearing ring (103) internal annular perimeter, and from there through at least one lubrication hole to each interface between the linear, convex, outer perimeter of the bearing ring (103) and the linear, concave, surface of the bearing pad (105) of each piston (106) base.

The crankdisk (101) has a diameter that fits tightly but slidably inside the bearing ring (103). The crankdisk (101) has a perimeter design, known from the prior art, that provides for hydrodynamic lubrication conditions between the crankdisk (101) outer annular surface and the bearing ring (103) inner annular surface. The inside distance between the linear, concave, bearing pad (105) surfaces of the two integrated piston heads is such that it will accommodate the crankdisk (101) and the bearing ring (103) including an acceptable tolerance known from the prior art.

In the preferred embodiment an annular, flat, inner perimeter profile bearing ring (103) is installed on the crankdisk (101) as shown in FIG. 1, FIG. 2, FIG. 3, FIG. 4, and FIG. 5. The bearing ring (103) has two parallel outer perimeter, linear, convex, surface sections on opposite sides to provide for bearing ring outer perimeter surface interface to the linear, concave, bearing pads (105) installed on the piston (106) bases, as well as to prevent the bearing ring from rotating. In the preferred embodiment the bearing ring (103) outer linear, convex, surface sections engage the linear, concave, surfaces of the bearing pads (105) allowing for small axial, rotational, movement tolerance, relative to the perpendicular driveshaft (100) axis, for manufacturability, assembly, and operation, when the driveshaft (100) rotates and engages the bearing pads (105) of the piston (106) heads of the integrated piston structure. In the preferred embodiment also, the outer perimeter, linear, convex, surface sections of the bearing ring (103) are each provided with at least one lubrication hole to allow oil to pass from the crankdisk (101) to bearing ring (103) interface surface to the interface surface between the bearing ring (103) outer linear, convex, surface, and the bearing pad (105) linear, concave, surface, to provide for hydrodynamic lubrication condition.

The proposed design has the following benefits, and unique differences, when compared to the prior art (U.S. Pat. Nos. 12,025,224 B1, 8,875,673 B2, 8,534,240 B1, 8,109,244 B1, 5,402,755 and from SAE SP-1108, Paper No. 950090, Futuristic Concepts in Engines and Components, pp. 61-64, (1995)) design: First benefit and unique difference: The bearing ring (103), with inner perimeter annular design, and oil lubrication holes connecting the inner annular surface of the bearing ring to the bearing ring outer linear, convex, surfaces facing the linear, concave, surface of the bearing pad (105) installed on the piston (106) base, provides for hydrodynamic lubrication between both the outer perimeter of the crankdisk (101) and the inner perimeter of the bearing ring (103), as well as the outer linear, convex, surfaces of the bearing ring (103) and the linear, concave, bearing pads (105) installed on the piston (106) bases. The interfacing surface shapes (linear, convex, outer perimeter of the bearing ring (103) interfacing with the linear, concave, bearing pad (105)) help maintain and guide the lubricating oil within the interface surface, when the crankdisk (101) rotates, guiding by centrifugal force the oil to escape via both ends of the linear interface between the bearing pad (105) and bearing ring (103), while at the same time providing hydrodynamic lubrication on the interface surface. Second benefit and unique difference: The bearing ring (103) outer linear, convex, surface sections engage the linear, concave, surfaces of the bearing pads (105) allowing for small axial, rotational, movement tolerance, relative to the driveshaft (100) axis, for manufacturability, assembly, and operation, when the driveshaft (100) rotates and engages the bearing pads (105) of the piston (106) heads of the integrated piston structure. The proposed design accomplishes both the improved hydrodynamic lubrication objective (between the bearing ring linear, convex, outer perimeter surface sections, and the linear, concave, bearing pad), as well as the objective of providing for small axial, rotational, movement tolerance for manufacturability, assembly, and operation, of the crankdisk bearing ring to piston structure assembly, at the same time.

Without loss of generality, different piston head connecting member designs and arrangements that form a rigid double-headed piston and provide for keeping the bearing ring in its designed position, and different bearing ring outer perimeter designs that keep the bearing ring from rotating, and, in addition, different bearing ring outer perimeter designs that allow for small axial, rotational, tolerance for the piston structure in relation to the driveshaft axis and allow for hydrodynamic lubrication between the bearing ring outer perimeter linear surfaces (whether concave or convex) and different bearing pads (whether concave or convex) installed on the piston bases, when the crankdisk rotates do not change the bearing ring function, do not change the bearing ring to crankdisk lubrication arrangement, do not change the bearing ring to piston bearing pad lubrication arrangement and function, and, therefore, do not constitute a different invention.

For clarity and simplicity, significant engine parts are shown in FIG. 1, FIG. 2, FIG. 3, FIG. 4 and FIG. 5 only.

Further, it is appreciated from the FIG. 1, FIG. 2, FIG. 3, FIG. 4 and FIG. 5, and the above description, summarily that according to the present invention, since the crankdisk (101) slides under hydrodynamic conditions inside the improved bearing ring (103), which slides under hydrodynamic conditions on the bearing pad (105) surface installed on the piston (106) base, metal to metal high friction contact between the crankdisk (101) outer perimeter surface and the bearing ring (103) inner perimeter surface, as well as between the outer perimeter of the bearing ring (103) linear, convex, surfaces engaging the linear, concave, bearing pad (105) surfaces of the piston (106) bases, is avoided. While a bearing ring has been proposed in the referenced prior art, the specific design and requirements, which provide for improved lubrication under hydrodynamic conditions via the outer perimeter linear, convex, sections of the bearing ring interfacing the linear, concave, bearing pads installed on the piston bases, which provide for lubrication oil guide toward the ends of the linear bearing pads, and provide for small axial, rotational, movement tolerance, relative to the perpendicular driveshaft (100) axis, for manufacturability, assembly, and operation, as presented in FIG. 1, FIG. 2, FIG. 3, FIG. 4 and FIG. 5, have not been proposed for the Waissi Engine. The proposed design of the bearing ring (103) linear, convex, outer perimeter sections, and the linear, concave, bearing pad (105) function of the bearing in terms of providing improved lubrication to the interface between the bearing ring (103) outer linear, convex, section and the linear, concave, bearing pad (105) of the piston base guiding the oil to travel along the linear path toward the ends of the bearing pads, and allowing for small axial, rotational, movement tolerance, perpendicular to the driveshaft (100) axis, for manufacturability, assembly, and operation when the crankdisk rotates, summarily constitute a significant difference from the prior art for the Waissi Engine.

A bearing ring (103) substitution or replacement by other types of bearings or bearing rings which accomplish the same function do not constitute a different invention. A bearing pad (105) substitution or replacement by other types of bearings which accomplish the same function do not constitute a different invention. With respect to assembly, bearing weight, dynamic engine balancing, wear and tear, cost of bearings, and total cost of engine manufacture, the proposed solutions appear to be the simplest, most durable, and most cost effective.

What is claimed is:

1. An improved internal combustion engine, comprising: a driveshaft and means mounting the driveshaft for rotation about an axis; at least one pair of aligned and opposed cylinders; at least one double-headed piston, having at least one rigid connection between the piston heads forming an integrated rigid piston structure, reciprocating in said pair of cylinders; a circular crankdisk, for each said piston structure respectively, installed on said driveshaft, and allowing for a small lateral movement of said crankdisk on said driveshaft; the said crankdisk having an outer annular surface formed about a center that is laterally offset from the center of rotation of the said driveshaft, and attached to the said driveshaft; said piston structure body having a first slot, a second slot perpendicular to the first slot, the first slot being perpendicular to the piston axis and allowing the rotating movement of the driveshaft, and the second slot, allowing the rotating movement of the crankdisk; a bearing ring with a flat annular inner perimeter, mounted on the annular flat surface of the said crankdisk, which engages slidably under hydrodynamic conditions the annular surface of the said crankdisk, said bearing ring having an outer perimeter surface with two parallel flat linear surface sections, on opposite sides of said bearing ring, engaging slidably, under hydrodynamic conditions, said two said flat linear piston slot surfaces respectively when said crankdisk rotates preventing said bearing ring from rotating, said two flat linear sections on the outer perimeter of said bearing ring each having at least one hole through said bearing ring to allow lubrication oil to pass from the space in-between said bearing ring inner surface to the space between said bearing ring flat linear outer surface section and said flat linear piston slot wall;

wherein the improvement comprises of a bearing ring outer perimeter having a linear, convex, bearing ring surface section, one on each side of the outer perimeter, parallel to each other, engaging slidably, under hydrodynamic conditions, a linear, concave, bearing pad, installed on each said piston base, when the crankdisk rotates;

whereby said linear, convex, bearing surface section, of said bearing ring, facing and engaging said linear, concave, bearing pad installed on said piston base allows for small, axial rotational movement of said double-headed piston structure relative to said driveshaft rotation axis, and thereby, provides for manufacturing, assembly and operating tolerance when said driveshaft rotates;

whereby said linear, concave, bearing pad installed on said base of each said piston head helps hold and guide the lubricating oil in-between the linear, convex, outer perimeter surface of said bearing ring and linear, concave, surface of said bearing pad of said piston head toward the ends of said linear, concave, bearing pad, when said crankdisk rotates, and a centrifugal force caused by said crankdisk rotation, in addition to oil pressure generated by the oil pump, pushes lubricating oil to the interface in-between and along each said linear, convex, outer perimeter surface section of said bearing ring and towards the linear section ends of each said linear, concave, bearing pad surface, respectively;

whereby said bearing ring outer perimeter dimension, between said linear, convex, bearing surfaces is such that said bearing ring with said linear, convex, surface sections facing and engaging said linear, concave, bearing pads installed on said base of each said piston head, fits tightly and slidably inside and within said linear, concave, bearing pads of said double-headed piston heads of said piston structure;

whereby said linear, convex, surface sections on the outer perimeter of said bearing ring, engaging said linear, concave, bearing pad surfaces of said bases of each said piston head, prevent said bearing ring from rotating;

whereby said two linear, convex, sections, on the outer perimeter of said bearing ring, each have at least one hole through said bearing ring to allow lubrication oil to pass from the space in-between said crankdisk outer annular surface and said bearing ring inner surface to the space between said bearing ring linear, convex, outer surface section and said linear, concave, bearing pad surface;

whereby lubrication oil is pumped under pressure through the inside cavity of said driveshaft through provided oil channels inside said crankdisk to the space between said crankdisk outer perimeter surface and said bearing ring inner perimeter surface, and through one or more said holes to the lubrication space between each said linear, convex, outer surface section of said bearing ring and each said parallel linear, concave, surface of said bearing pad of said piston base;

whereby said crankdisk with the aid of said bearing ring transmits the piston force of said double-headed piston structure to said driveshaft and causes said driveshaft to rotate about its axis.

* * * * *